United States Patent [19]

Cavalca et al.

[11] Patent Number: 5,686,199

[45] Date of Patent: Nov. 11, 1997

[54] FLOW FIELD PLATE FOR USE IN A PROTON EXCHANGE MEMBRANE FUEL CELL

[75] Inventors: Carlos Cavalca, Wheeling; Stephen Thomas Homeyer, Arlington Heights, both of Ill.; Eric Walsworth, Olivet, Mich.

[73] Assignee: AlliedSignal Inc., Morris Township, N.J.

[21] Appl. No.: 646,408

[22] Filed: May 7, 1996

[51] Int. Cl.$^6$ .............................. H01M 8/04; H01M 8/10
[52] U.S. Cl. .................... 429/30; 429/34; 429/39
[58] Field of Search .................... 429/30, 34, 38, 429/39

[56] References Cited

U.S. PATENT DOCUMENTS

| | | | |
|---|---|---|---|
| 4,403,018 | 9/1983 | Alfenaar et al. | 429/39 X |
| 4,684,582 | 8/1987 | Granata et al. | 429/39 |
| 4,686,159 | 8/1987 | Miyoshi | 429/39 |
| 4,769,297 | 9/1988 | Reiser et al. | 429/17 |
| 4,826,742 | 5/1989 | Reiser | 429/33 |
| 4,973,530 | 11/1990 | Vanderborgh et al. | 429/13 |
| 4,988,583 | 1/1991 | Watkins et al. | 429/30 |
| 5,108,849 | 4/1992 | Watkins et al. | 429/30 |
| 5,252,410 | 10/1993 | Wilkinson et al. | 429/33 |
| 5,260,143 | 11/1993 | Voss et al. | 429/13 |
| 5,300,370 | 4/1994 | Washington et al. | 429/34 |
| 5,382,478 | 1/1995 | Chow et al. | 429/26 |
| 5,514,487 | 5/1996 | Washington et al. | 429/38 X |

OTHER PUBLICATIONS

Stephen T. Homeyer et al., co-pending and commonly assigned U.S. Patent Application having Serial No. 08/560,429, filed Nov. 1995, "Membrane/Electrode Apparatus For Use In A Proton Exchange Membrane Fuel Cell And Method Of Fabrication", in its entirety.

L. Hegedus, "Effects of Channel Geometry on the Performance of Catalytic Monoliths", Proceedings of the American Chemical Society, Chicago Meeting, Aug. 26–31, 1973, pp. 487–502.

Primary Examiner—Stephen Kalafut
Attorney, Agent, or Firm—John R. Rafter

[57] ABSTRACT

A flow field plate for use in a PEM fuel cell using a gaseous fuel and oxidant, comprising a substantially planar surface and a flow field formed in the substantially planar surface is provided. The plate further includes a network of flow passages for supplying the fuel or oxidant to the flow field and a network of flow passages for receiving the gases discharging from the flow field. The flow field includes a plurality of substantially symmetric flow sectors having separate inlets and outlets communicating with the networks of supply and exhaust flow passages, respectively. Each flow sector includes a plurality of substantially parallel flow channels formed in the substantially planar plate surface, with each sector partitioned so as to subdivide the channels into a plurality of sets of channels disposed in serial flow relationship, with each set including a plurality of the channels disposed in parallel flow relationship. Consequently, the fuel or oxidant traverses each sector in a plurality of passes, with the gas flowing through a plurality of channels during each pass. Accordingly, the flow field configuration permits the reactant gases to be transported so as to supply the gases evenly to the entire active area of the corresponding fuel cell electrode with very low reactant gas pressure drop.

14 Claims, 4 Drawing Sheets

FLOW FIELD PLATE FOR USE IN A PROTON EXCHANGE MEMBRANE FUEL CELL

BACKGROUND OF THE INVENTION

1. Field of the Invention

The present invention relates generally to fuel cells and, more particularly, to a flow field plate for use in a proton exchange membrane fuel cell.

2. Related Art

A fuel cell is a galvanic cell in which the chemical energy of a fuel is converted directly into electrical energy by means of electrochemical processes. The basic components of all fuel cells are electrodes comprising an anode and a cathode, electrocatalysts and an electrolyte. A fuel cell is a two chamber chemical reactor in which a fuel and an oxidizing agent are continuously and independently supplied to the anode and cathode electrodes, respectively, of the fuel cell.

Fuel cells may be classified by the type of electrolyte, i.e., liquid or solid, that they contain. Fuel cells in which the electrolyte is a solid polymer may be referred to as a proton exchange membrane (PEM) fuel cell. PEM fuel cells utilizing hydrogen and oxygen as the reactants were used during the 1960's in the U.S. NASA Space Program but were not developed for commercial use at that time. In recent years an intense interest in automotive applications of fuel cells has arisen within the private sector. This trend has been driven by recent legislation and by increased public concern over environmental pollution, as well as the need for renewable sources of energy. Hydrogen/air PEM fuel cells are particularly suited for use in zero-emission vehicles (ZEVs), since water and electric current are the only products of the fuel cell, as illustrated below. The PEM fuel cell uses a proton-conducting membrane as a solid electrolyte. PEM fuel cells typically comprise a perfluorinated sulphonic acid polymer electrolyte membrane sandwiched between two catalyzed electrodes, which typically utilize platinum supported on carbon as the electrocatalyst. In a hydrogen-fueled PEM fuel cell, hydrogen is consumed at the anode, producing protons and electrons as shown in equation [1]. The protons are transported through the proton-conducting membrane to the cathode, while the electrons travel from the fuel cell anode through an external electrical load and back to the cathode. At the cathode three-phase boundaries, oxygen reacts with protons and electrons at the electrocatalyst sites, yielding water as the reaction product as shown in equation [2]. Each three-phase boundary constitutes an electrocatalytic reactive site where the active metal, the proton-conducting polymer and the gas phase contact each other. The overall fuel cell reaction then becomes the combination of hydrogen and oxygen with the formation of water and electric power as the reaction products as shown in equation [3].

$$2H_2 \rightarrow 2H^+ + 4e^- \qquad [1]$$

$$O_2 + 4H^+ + 4e^- \rightarrow 2H_2O \qquad [2]$$

$$2H_2 + O_2 \rightarrow 2H_2O + \text{Electric Power} \qquad [3]$$

A fuel cell reactor may comprise a single-cell, or a multi-cell stack. In either case, the membrane/electrode assembly (MEA), comprising the proton-conducting membrane and the anode and cathode, is typically sandwiched between two highly (electrically) conductive flow field plates which may serve multiple functions. First, these plates may function as current collectors providing electrical continuity between the fuel cell voltage terminals and electrodes. Additionally, the flow field plates provide mechanical support for the MEA and distribute the reactants and water across the active area of the MEA electrodes, which is accomplished by a flow field imprinted into the side of each plate in direct contact with the electrodes of the MEA. It is well known that the performance of a PEM fuel cell is highly dependent on the efficient transport of reactants to the electrodes, on the uniform humidification of the MEA, and on the appropriate water management of the cell, i.e., the supply and removal of water produced during operation of the cell. Insufficient or uneven humidification of the active areas of the electrodes results in a loss of performance due to dehydration of the proton exchange membrane. In addition, significant attenuation of performance at high current densities may be caused by insufficient removal of liquid water from the cathode. Since flow field design controls the reactant concentration gradient, flow rate, pressure drop and water distributions, the flow field design affects the performance of PEM fuel cells.

Although a variety of flow field designs are known, conventional flow field designs typically comprise either pin or serpentine designs, as referred to in the art. An example of a flow field design of the pin-type is illustrated in U.S. Pat. No. 4,769,297 to Reiser, et at. which discloses an anode flow field plate 48 and a cathode flow field plate 54 having projections 50 and 56, respectively, which may be referred to as pins. The fuel flows across the anode plate 48 through the intervening grooves formed by projections 50, with the oxidant similarly flowing through intervening grooves formed in the cathode flow field plate 54. Other examples of flow fields having a pin-type design are illustrated in U.S. Pat. No. 4,826,742 to Reiser and in the prior art FIG. 6 of the present application which illustrates a plurality of cubical pins protruding from a flow field plate. Pin-design flow fields result in low reactant pressure drop across the corresponding flow field. However, reactants flowing through such flow fields tend to follow the path of least resistance across the flow field which may result in channeling and the formation of stagnant areas, which in turn results in poor fuel cell performance. The formation of stagnant areas is particularly problematic with flow fields having certain geometrical shapes.

An example of a flow field incorporating a single serpentine design is illustrated in U.S. Pat. No. 4,988,583 to Watkins, et al. As shown in FIG. 2 of Watkins, et al., a single continuous fluid flow channel 22 is formed in a major surface 15 of flow field plate 12. A reactant enters the fluid inlet 24 of the serpentine flow channel 22 and exits through the fluid outlet 26 after traversing a major central area of the plate 12 through the plurality of passes formed by channel 22. Such a single serpentine flow field forces the reactant flow to traverse the entire active area of the corresponding electrode, thereby eliminating areas of stagnant flow. However, this channeling of reactant across the active area results in a relatively high reactant flowpath length which creates a substantial pressure drop and significant concentration gradients from inlet to outlet. Additionally, the use of a single channel to collect all of the liquid water product from the electrode may promote flooding of the single serpentine, especially at high current densities. The pressure drop problem, at least with respect to higher current density applications, is acknowledged in U.S. Pat. No. 4,988,583 at column 7, lines 15–27, where it is noted that several continuous separate flow channels may be provided which traverse the flow field plate typically in substantially the same serpentine manner in order to limit the pressure drop through the cell and thus minimize the parasitic power required to pressurize the air. The referenced multiple serpentine flow field design is illustrated in FIG. 4 of U.S. Pat. No. 5,108,849 to Watkins, et al., which is a continuation-in-part of U.S. Pat. No. 4,988,583. Although multiple serpentine flow field designs of this type reduce the reactant pressure drop relative to single serpentine designs, the reactant pressure drop through each of the serpentines remains relatively high due to the relatively high reactant flowpath of each serpentine.

Accordingly, at the time of the present invention, fuel cell designers continued to search for an improved flow field design so as to optimize the performance of PEM fuel cells.

SUMMARY

Accordingly, the present invention is directed to a flow field plate for use in a proton exchange membrane fuel cell using a gaseous fuel and a gaseous oxidant. According to a preferred embodiment of the present invention, the flow field plate comprises a substantially planar surface having a generally central portion and a flow field formed in the generally central portion. The flow field is effective for transporting either of the gaseous fuel or oxidant during operation of the fuel cell. The plate further includes at least one supply flow passage effective for supplying either the fuel or oxidant to the flow field during operation of the fuel cell and at least one exhaust flow passage effective for receiving the fuel or oxidant discharging from the flow field during operation of the fuel cell. The flow field includes a plurality of substantially symmetric flow sectors, with each sector having a separate inlet communicating with the at least one supply flow passage and a separate outlet communicating with the at least one exhaust flow passage. The gaseous fuel or gaseous oxidant traverses each of the flow sectors in a plurality of passes during operation of the fuel cell.

In other preferred embodiments, the flow field plate may include the following additional structural features and functions. Each of the flow sectors includes a plurality of substantially parallel flow channels formed in the generally central portion of the substantially planar surface of the flow field plate. Each of the flow sectors is partitioned so as to subdivide the plurality of flow channels into a plurality of sets of the flow channels, with each of the sets of flow channels including a plurality of flow channels. The sets of the flow channels are disposed in serial flow relationship with one another, while the flow channels of each of the sets are disposed in parallel flow relationship with one another, whereby the gaseous fuel or gaseous oxidant traverses each of the flow sectors in the aforementioned plurality of passes during operation of the fuel cell, wherein the number of passes is equal to the number of the sets of the flow channels.

Each of the flow sectors further includes an inlet channel which includes the inlet of the flow sector, and communicates with each of the flow channels of an upstream one of the sets of flow channels. Each flow sector further includes an outlet channel including the outlet of the flow sector, with the outlet channel communicating with each of the flow channels of a downstream one of the sets of flow channels. Additionally, each flow sector further includes at least one connecting channel interconnecting each adjacent pair of the sets of flow channels and communicating with each set of the adjacent pair of sets of flow channels. The at least one supply and at least one exhaust flow passages may comprise a plurality of supply and exhaust flow passages, respectively, with each of the supply passages communicating with the inlet of one of the flow sectors and each of the exhaust passages communicating with the outlet of one of the flow sectors.

The flow field may comprise four of the flow sectors, each flow sector may include three of the sets of flow channels corresponding to the upstream, downstream and an intermediate set of channels disposed between the upstream and downstream sets of channels, and each set of flow channels may include five of the flow channels. Each flow sector may further include a pair of connecting channels, with a first one of the connecting channels interconnecting the upstream and intermediate sets of flow channels, and a second one of the connecting channels interconnecting the intermediate and downstream sets of flow channels.

Each of the plurality of substantially parallel flow channels comprises an open-faced flow channel, and the plurality of flow channels defines a plurality of lands, with the flow channels and lands being interdigitated. Each of the flow channels may have a substantially square cross-section and includes a length and a depth, with the depth being substantially constant throughout the length. Each of the lands include a width, and a ratio of the width of the channels to the width of the lands ranges from about 1.0 to about 2.0. The flow field plate is made of a non-porous electrically conductive material, which may comprise graphite.

A main advantage of the flow field plate of the present invention is the ability to symmetrically transport reactant gases across the flow field of the plate while eliminating areas of stagnant flow, maintaining a low pressure drop, and distributing the reactants more uniformly over the entire flow field.

BRIEF DESCRIPTION OF THE DRAWINGS

The aforementioned advantage, as well as the structural features and functions, and other advantages of the present invention, will become more apparent from the subsequent detailed description of the preferred embodiments when taken in conjunction with the accompanying drawings, wherein.

DETAILED DESCRIPTION

Figure 1:
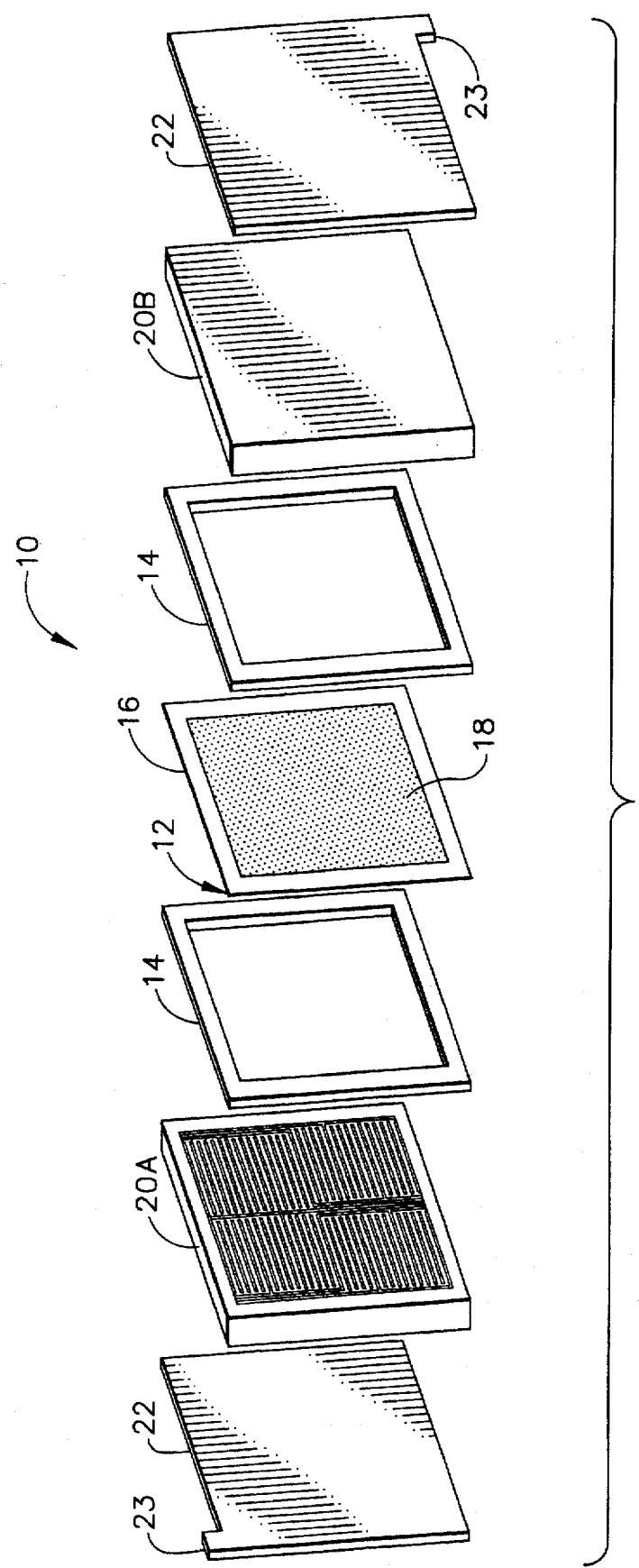
FIG. 1 is an exploded perspective view illustrating a single-cell PEM fuel cell which may incorporate at least one of the flow field plates of the present invention.

Referring now to the drawings, wherein like reference numerals have been used for similar elements throughout, FIG. 1 is an exploded perspective view illustrating a single-cell proton exchange membrane (PEM) fuel cell 10 which includes a membrane/electrode apparatus (MEA) 12 and a pair of gaskets 14 which are disposed on either side of the MEA 12. The PEM fuel cell 10 further includes at least one, and preferably two flow field plates 20 according to the present invention. In the illustrated embodiment shown in FIG. 1, fuel cell 10 includes a pair of flow fields plates 20, which are designated 20A and 20B in FIG. 1 and correspond to an anode flow field plate and a cathode flow field plate, respectively. Fuel cell 10 further includes a pair of current collector plates 22, preferably made of copper, with one of the current collector plates 22 disposed adjacent the anode flow field plate 20A and the other current collector plate 22 disposed adjacent the cathode flow field plate 20B. The various elements of fuel cell 10 are compressed to provide contacting engagement between adjacent elements of fuel cell 10 for subsequently described purposes. Alternatively, fuel cell 10 may include an external housing which surrounds the elements shown in FIG. 1, and is bolted together to supply the required compressive damp load. In the illustrated embodiment shown in FIG. 1 the PEM fuel cell 10 comprises a hydrogen/air fuel cell. However, the flow field plates 20 of the present invention may be used in conjunction with fuel cells having other reactants including, but not limited to hydrogen/oxygen fuel cells. In the illustrative embodiment, hydrogen and water vapor are supplied to the anode flow field plate 20A and air and water vapor are supplied to the cathode flow field plate 20B, with the reactants distributed to elements of MEA 12 as subsequently discussed.

MEA 12 includes a proton exchange membrane 16, comprising a proton-conducting material. A variety of materials are effective for use in fabricating membrane 16 and are well known, such as perfluorinated polymers. A specific example of such a polymer is a perfluorinated sulfonic acid polymer electrolyte marketed under the trademark Nafion® registered to E. I. DuPont De Nemours & Company. MEA 12 further includes a first, catalyzed electrode 18, comprising a cathode, and a second, catalyzed electrode (not shown), comprising an anode. The cathode 18 and the anode are bonded to membrane 16. MEA 12 may be constructed as described in copending and commonly assigned U.S. patent application having Ser. No. 08/560,429. However, the specific composition and method of fabricating MEA 12 does not form a part of the present invention and therefore, MEA 12 may comprise a conventional membrane/electrode apparatus.

The cathode 18 and the anode typically comprise a porous backing made of an electrically conductive material, typically carbon paper, cloth or felt, and an electrocatalyst layer (not shown) bonded to the porous backing. The electrocatalyst layers of each electrode comprise a mix of electrocatalyst particles (not shown) and proton-conducting particles (not shown). Each electrocatalyst particle comprises a support particle made of an electrically conductive material, typically carbon, and very small active metal particles, typically a noble metal such as platinum, which are highly dispersed on the carbon support particles.

Figure 2:
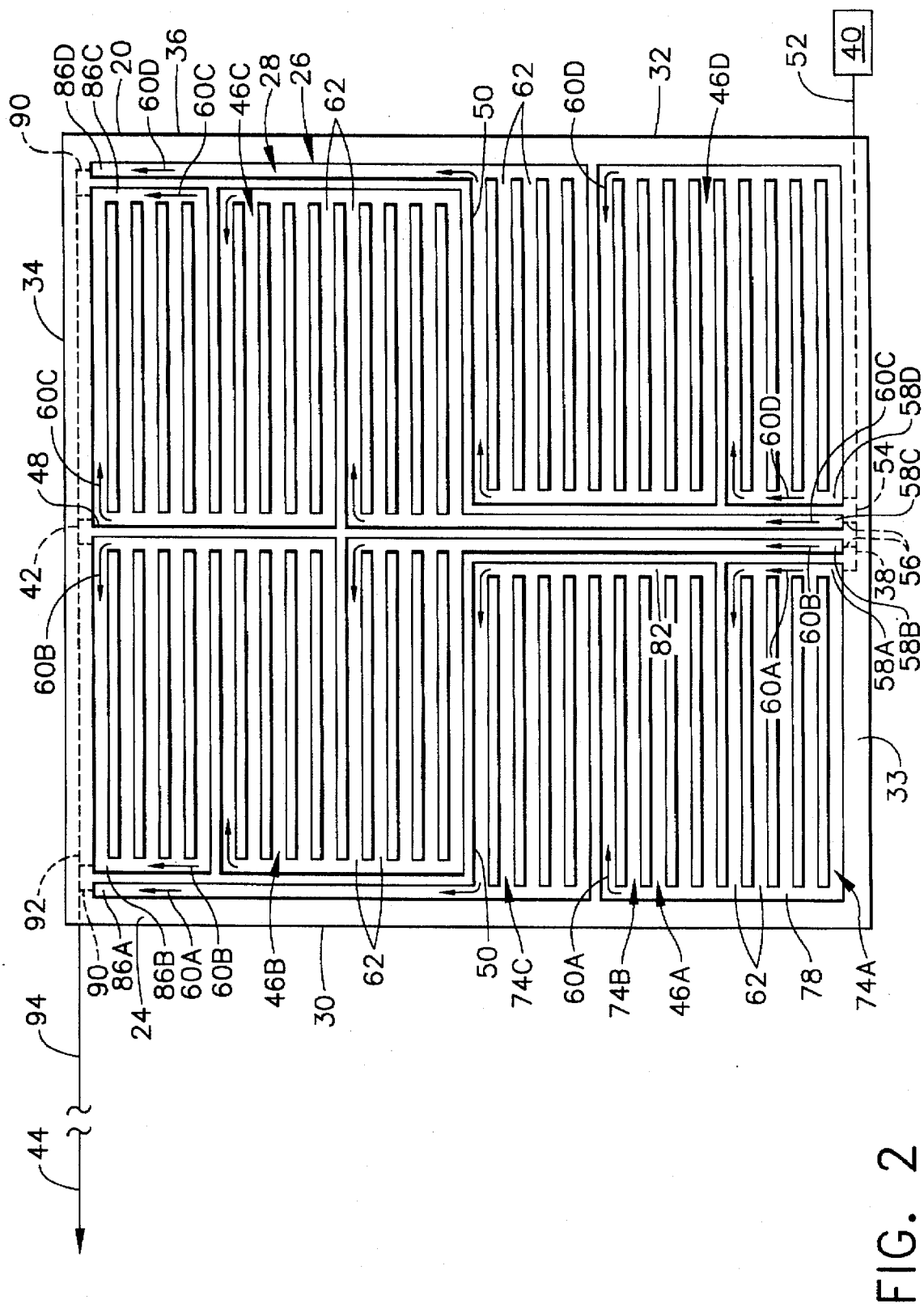
FIG. 2 is an enlarged plan view further illustrating the flow field plate of the present invention.
Figure 3:
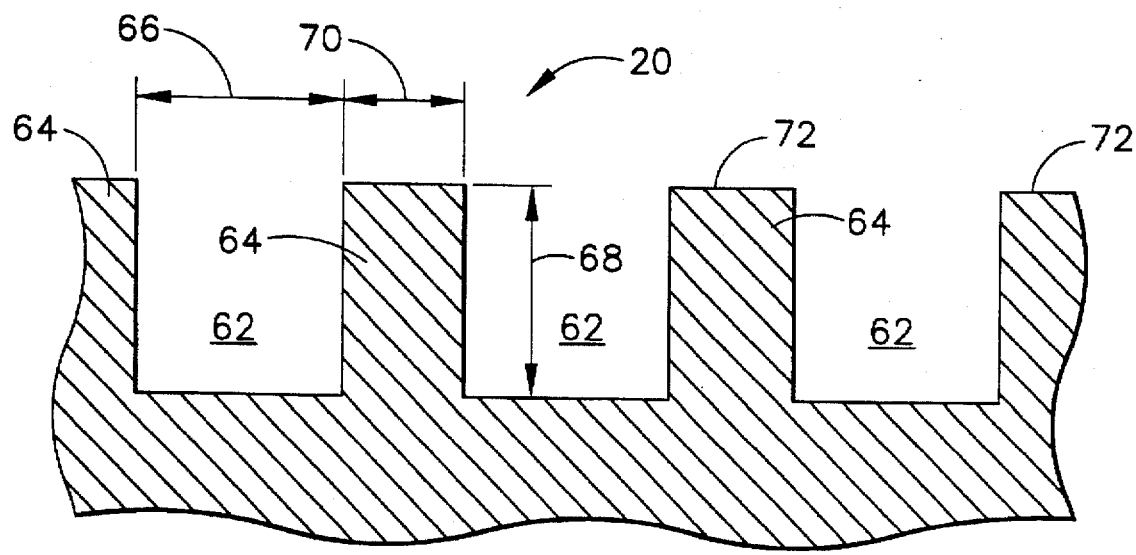
FIG. 3 is a fragmentary cross-sectional view further illustrating the flow field plate shown in FIG. 2.

Referring now to FIGS. 2 and 3, the specific construction and function of the flow field plate 20, which comprise central features of the present invention, are discussed in greater detail. It is noted that the subsequent discussion pertaining to flow field plate 20 may apply to either the anode flow field plate 20A or the cathode flow field plate 20B, depicted in FIG. 1. The flow field plate 20 is made of an electrically conductive material, and is preferably made from non-porous nuclear grade carbon blocks. However, other conventional electrically conductive materials such as electrically-conductive polymers, metals, etc., may be used to fabricate flow field plate 20. Plate 20 includes a substantially planar surface 24, having a generally central portion 26, and a flow field 28 formed in the generally central portion 26 of surface 24. In the illustrated embodiment, both the flow field plate 20 and the flow field 28 are shown to have a generally square shape as viewed in plan, which is typical of the shape of conventional, industry-standard flow fields and plates. However, it should be understood that the novel features of the flow field plate and included flow field of the present invention are not limited to a particular geometric shape. It should be further understood that flow field 28 does not have to be centrally located in surface 24, as shown in the illustrative embodiment, to realize the advantages of the present invention. The outer periphery of the flow field 28 is formed by border lands 30, 32, 33, and 34 and corresponds in size to the active area of either the cathode 18 or the anode of fuel cell 10. Lands 30, 32, 33 and 34 also form an outer periphery 36 of plate 20. The outer periphery 36 may correspond generally in size to that of the current collector plates 22 and gaskets 14. Flow field 28 is effective for transporting either gaseous fuel, if plate 20 comprises the anode flow field plate 20A, or a gaseous oxidant if plate 20 comprises the cathode flow field plate 20B, during operation of fuel cell 10. It should be understood that within the present context the term gaseous fuel refers to a fuel such as hydrogen which may be humidified with water vapor and similarly, the term gaseous oxidant may refer to either air or oxygen which may also be humidified with water vapor.

The flow field plate 20 further includes a network of supply flow passages shown schematically at 38 which is effective for supplying either gaseous fuel or gaseous oxidant from reactant source 40 to flow field 28 during operation of fuel cell 10. Additionally, plate 20 includes a network of exhaust flow passages shown schematically at 42 which is effective for receiving either the gaseous fuel or gaseous oxidant discharging from flow field 28 during operation of fuel cell 10. The reactant gases discharging through network 42 are routed externally of plate 20 as shown by flow arrow 44.

Flow field 28 includes a plurality of substantially symmetric flow sectors 46, with the illustrative embodiment including four flow sectors 46, designated as 46A, 46B, 46C and 46D, respectively. The boundaries of flow sectors 46A–46D are formed by border lands 30, 32, 33 and 34, a substantially straight interior land 48 and a pair of generally Z-shaped interior lands 50. Flow sectors 46A–46D are substantially symmetric in the sense that they are substantially the same size, with the average path length that the reactant gases follows through any of the sectors being substantially the same. The network 38 of supply flow passages includes an upstream flow passage 52 having one end in fluid flow communication with the source of reactant gas 40, and the other end in fluid flow communication with a distribution flow passage 54. The network 38 of flow passages further includes four sector supply flow passages 56 which are in fluid flow communication with the distribution passage 54. Each of the flow sectors 46A, 46B, 46C, and 46D include an inlet flow channel designated as 58A, 58B, 58C and 58D, respectively, which are separate and independent from one another. A proximal end of each of the inlet channels 58A–58D comprises an inlet for the corresponding flow sectors 46A–46D, and is fluid flow communication with one of the sector supply flow passages 56 of network 38. During operation of fuel cell 10, the gaseous reactant flows from source 40 through flow passage network 38 and separately into each of the inlet channels 58A–58D of flow sectors 46A–46D, respectively, as indicated by flow arrows 60A–60D, respectively.

The following additional structural features and functions of flow field 28 will be discussed and illustrated in FIG. 2 with particular reference to flow sector 46A, but apply equally to the remaining flow sectors 46B–46D. Each of the flow sectors 46A–46D includes a plurality of substantially parallel flow channels 62 formed in the generally central portion 26 of the substantially planar surface 24 of flow field plate 20. As shown in greater detail in FIG. 3, each of the channels 62 is open-faced, or has an open top. Accordingly, the plurality of substantially parallel flow channels 62 define a plurality of substantially parallel lands 64, with flow channels 62 interdigitated with lands 64. As shown in FIG. 3, each channel 62 includes a width 66 and a depth 68 which is substantially constant along the length of each of the channels 62. Width 66 and depth 68 are substantially the same, or equal in magnitude, for each of the channels 62. Additionally, as shown in FIG. 3 each flow channel 62 may have a substantially square cross-section, although the cross-section of channel 62 may comprise other geometric shapes which include, but are not limited to, trapezoidal, semi-circular or rectangular shapes, and the square, trapezoidal or rectangular shapes may include rounded corners. Each land 64 has a width 70 and a top surface 72 which is in contacting engagement with the porous backing of the corresponding electrode, i.e., either the cathode 18 or the anode of fuel cell 10, after the elements of fuel cell 10 have been compressed as discussed previously. This contacting engagement provides electrical continuity between the flow field plates 20A and 20B and the anode and cathode 18, respectively, of fuel cell 10. The widths 66 and 70 of the flow channels 62 and lands 64, respectively, are selected so that the reactant gases flowing through each of the flow channels 62 is permitted to diffuse outward through the porous backings of the corresponding electrodes in a manner which distributes the reactant gases to the entire active area of the anode and cathode 18 of fuel cell 10. If the widths 70 of lands 64 were too wide, as compared to the width 66 of each channel 62, portions of the active area of the corresponding electrodes would not be exposed to the reactant gases. The inventors have determined that the width 66 of each flow channel 62 preferably ranges from about 1 mm to about 5 mm, and is most preferably about 3 mm for the illustrative embodiment where the size of flow field 28 is about 200 $cm^2$. However, it should be noted that width 66 may vary in size as a function of the overall size of flow field 28. Due to the square cross-section of flow channels 62 in the illustrative embodiment, the size of depth 68 is the same as that of width 66. If the cross-section of each flow channel 62 comprises a geometric shape other than a square, the inventors have determined that the channel depth 68 preferably ranges from about 0.25 mm to about 5.25 min. The inventors have further determined that the width 70 of each land 64 preferably ranges from about 0.5 mm to about 5 mm, and most preferably is about 2 mm for the illustrative embodiment. The ratio of the width 66 of channels 62 to the width 70 of lands 64 preferably ranges from about 1.0 to about 2.0, and is most preferably about 1.5, regardless of the overall size of flow field 28.

Each of the flow sectors 46A–46D is partitioned so as to subdivide the plurality of substantially parallel flow channels 62 into a plurality of sets 74 of the flow channels 62, with each set 74 including a plurality of the flow channels 62. According to the preferred embodiment illustrated in FIG. 2, each of the flow sectors 46A–46D includes three sets 74 of the flow channels 62, which are designated 74A, 74B and 74C, respectively for flow sector 46A in FIG. 2. However, other numbers of flow sets 74 for each of the flow sectors 46A–46D are considered to be within the scope of the present invention. Each of the sets 74 of the flow channels 62 includes five of the flow channels 62 according to the preferred embodiment illustrated in FIG. 2. However, each set 74 of flow channels 62 may include other numbers of the flow channels 62. The particular choice of the number of flow sectors 46, the number of sets 74 of flow channels 62 per flow sector 46, and the number of flow channels 62 per set 74 is dependent upon the shape of flow field 28, the overall size of the active area of the corresponding electrodes and other design parameters such as maximum allowable pressure drop, flowrate, etc., which vary from application to application. The inventors have determined that with a square shaped flow field 28, four sectors 46 are optimum and that three sets 74 of flow channels 62, with five channels 62 in each set 74 provides an optimal minimum pressure drop and a uniform and symmetric distribution of reactants and water. In the illustrated embodiment shown in FIG. 2, the sets 74A, 74B and 74C of flow channels 62 of flow sector 46A correspond, respectively, to an upstream, an intermediate, and a downstream set 74 of flow channels 62. The sets 74A, 74B and 74C are disposed in series flow relationship with one another, while the five channels 62 included in each of the flow sets 74A, 74B and 74C are disposed in parallel flow relationship with one another. After the reactant gas enters the inlet channel 58A of flow sector 46A, as shown by arrow 60A, the reactant gas flows through each of the substantially parallel channels 62 of the upstream set 74A, and then discharges into a connecting channel 78. Connecting channel 78 interconnects the upstream set 74A of channels 62 and the intermediate set 74B of channels 62 of flow sector 46A, with connecting channel 78 being in fluid flow communication with each of the channels 62 of sets 74A and 74B. The reactant gases flow from channel 78 through the channels 62 of sets 74B and then discharge into a connecting channel 82. Connecting channel 82 interconnects the intermediate and downstream sets 74B and 74C, respectively, of flow channels 62, with channel 82 being in fluid flow communication with each of the flow channels 62 of sets 74B and 74C. Accordingly, the reactant gases next flow through each of the flow channels 62 of the downstream set 74C and then discharge into an outlet channel 86A. Outlet channel 86A of flow sector 46A is in fluid flow communication with each of the flow channels 62 of the downstream set 74C and with a first exhaust flow passage 90 of the network 42 of exhaust flow passages. Network 42 includes three additional exhaust passages 90 with each communicating with the outlet channels 86B, 86C and 86D of the remaining flow sectors 46B–46D, respectively. The reactant gases entering each of the exhaust passages 90 then flow through an exhaust header passage 92 and are routed external of plate 20 via a discharge flow passage 94. Each of the flow passages of networks 38 and 42 preferably comprises a hole formed in plate 20, by conventional means such as drilling. Alternatively, the networks 38 and 42 of flow passages may comprise tubular manifolds, with the drilled flow passages of networks 38 and 42 replaced with hollow tubes having internal flow passages. As a further alternative, the supply passages 56 of network 38 and the exhaust passages 90 of network 42 may extend to the outer periphery of plate 20 so as to communicate with supply and exhaust manifolds, respectively, which are external to plate 20. Based on the foregoing, it may be seen that the reactant gases flow through each of the flow sectors 46A–46D in a plurality of passes, as depicted generally by flow arrows 60A–60D, respectively, with the number of passes corresponding to the number of sets 74 of the flow channels 62, and with the gases flowing through a plurality of the flow channels 62 during each of the plurality of passes. The average path lengths of the reactant gases through each of the flow sectors 46A–46D is substantially equal, thereby exposing each portion of the flow field 28 to the same flow conditions and pressure drop. Additionally, flow field 28 provides an even distribution of reactant gases across the entire MEA 12 to ensure maximum efficiency and electrode utilization.

Figure 6:
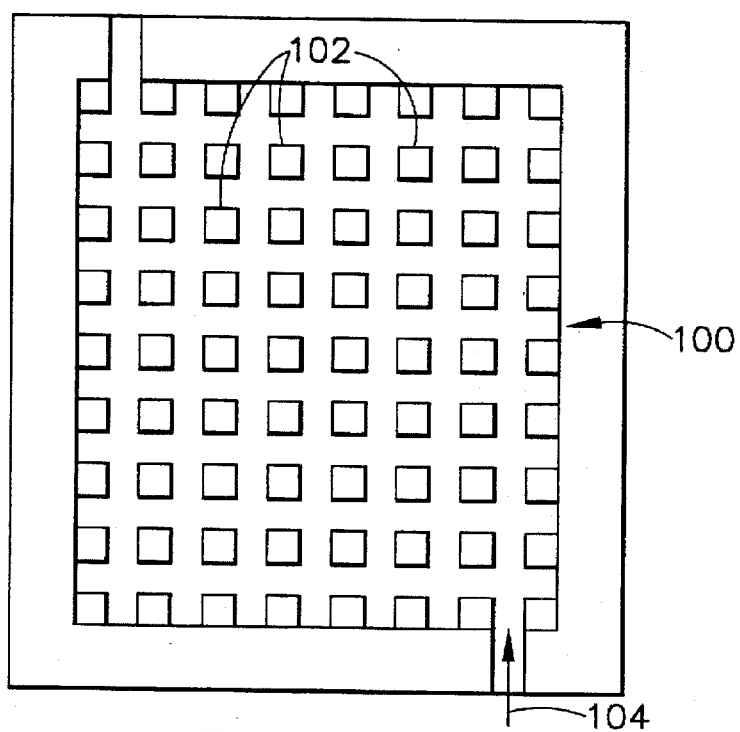
FIG. 6 is a plan view illustrating a prior art flow field plate comprising a pin-type design.
Figure 4:
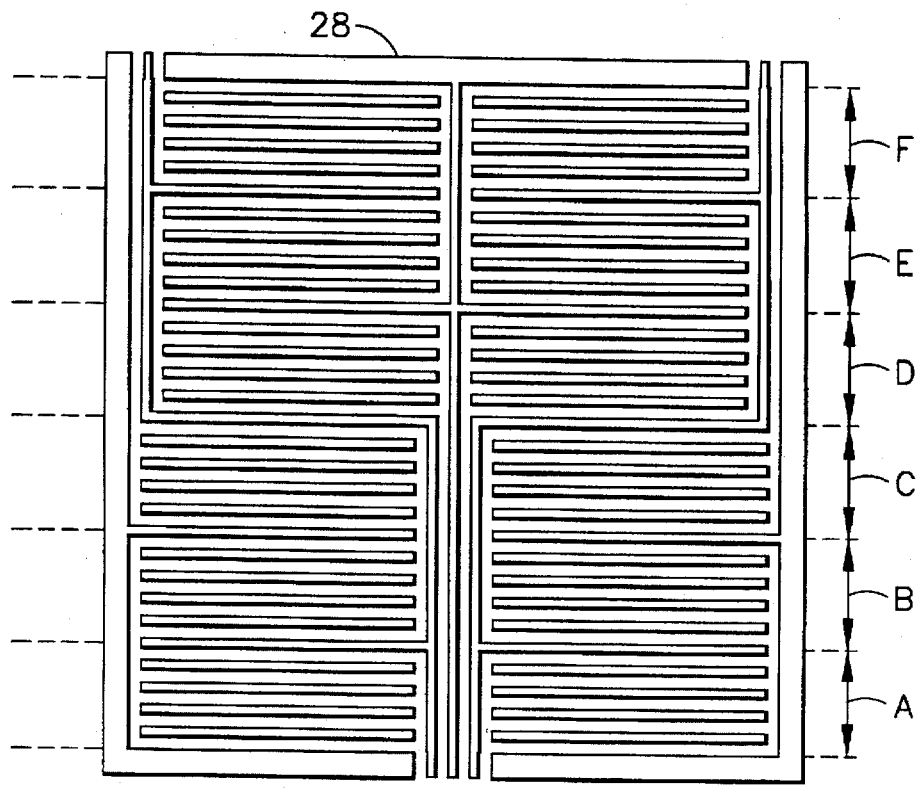
FIG. 4 is a plan view illustrating the flow field plate of the present invention subdivided into sections for purposes of comparative analysis only.
Figure 5:
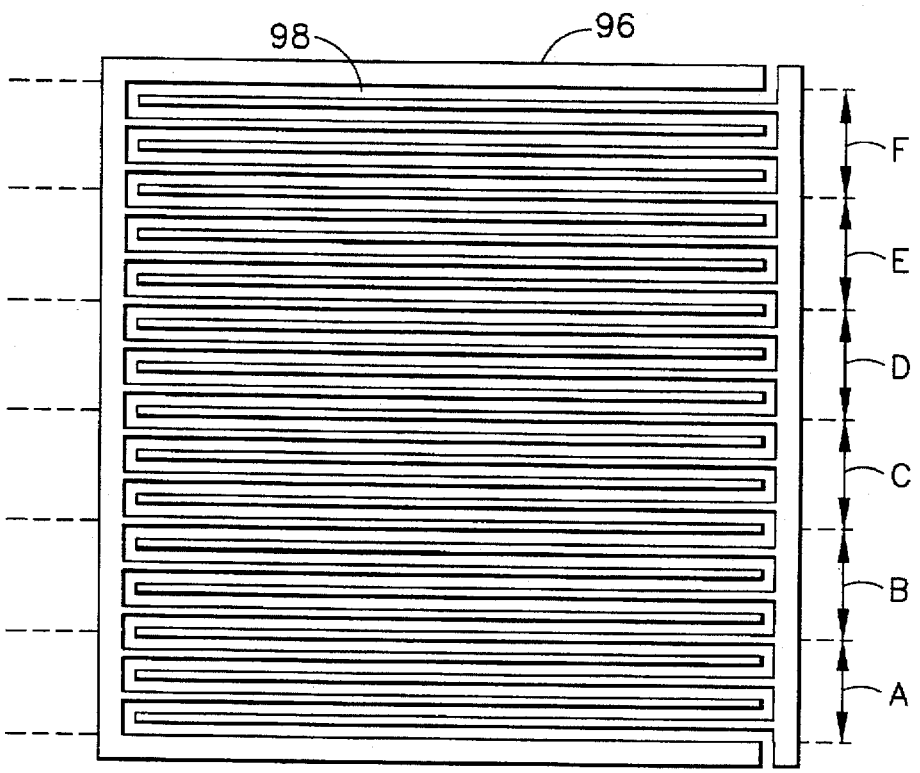
FIG. 5 is a plan view of a prior art, single serpentine flow field plate subdivided into sections for purposes of comparative analysis only.

The following comparative analysis is provided, with reference to FIGS. 4–6, to demonstrate some of the advantages which may be achieved by following the teachings of this invention.

COMPARATIVE ANALYSIS

1.0 Pressure Drop Comparisons

FIG. 4 illustrates the flow field 28 of the present invention, subdivided into analytical sections for purposes of analysis, while FIG. 5 illustrates a square shaped flow field 96 having a single serpentine flow channel 98 traversing flow field 96 in a plurality of passes, with flow field 96 being similarly subdivided for purposes of analysis. FIG. 6 illustrates a rectangular shaped flow field 100 having a plurality of spaced, generally cubic pins 102 with gases flowing between the spaces formed by the pins 102. The inventors calculated the pressure drop of a reactant gas, comprising air and water vapor, flowing through each of the flow fields illustrated in FIGS. 4–6 and through two additional flow fields (not shown), with each traversed by a multi-channel serpentine (corresponding to 5 separate channels in one case and 10 separate channels in the other). The pressure drop in each case was calculated using the following equation which pertains to fluid flow through a duct:

$$\Delta p = \frac{f L G^2}{4 R \rho}$$

wherein:
f=length mean value &the friction factor, commonly referred to as the Darcy friction factor;
L=length of the channel, in cm;
G=feed flux of the reactant gases in g/cm$^2$ sec;
$\rho$=average density of the flowing mixture along the channel in g/cm$^3$;
R=hydraulic radius of the channel, defined as twice the flow cross-section divided by the wetted perimeter.

The friction factor may be determined by the following equation which is valid for square-shaped ducts (provided by Hegedus, L., Proceedings of the American Chemical Society, Chicago Meeting, Aug. 26–31, 1973, pgs 487–502):

$$f = 56.92/Re$$

wherein:
Re—Reynolds Number=$2RG/\mu$
$\mu$=mean viscosity of the mixture in poise.

The above equations were used, in conjunction with the following test cell conditions to calculate the pressure drop through flow field 28. The calculations were then repeated for flow fields 96 and 100 and the two flow fields traversed by multi-channel serpentines. Each flow field had an overall size of approximately 200 cm$^2$ and had the same percent of wet (flow) area, which is about 52% for flow field 28. It is noted that this percent wet flow area of flow field 28 provides approximately an optimum balance between the surface area of lands 64 (for electrical contact) and the flow area of channels 62. The results of the calculations are presented in Table 1.
Simulated test cell conditions:
air flow rate=10.4 L/min(STP), corresponding to 3×stoichiometric flow;
water vapor flow rate=1.5 L/min(STP);
cell temperature=80° C.;
cell pressure=3 atm.

TABLE 1

| Pressure Drop Calculations | |
|---|---|
| Flow Field Geometry | $\Delta p$/torr |
| Flow Field 28 of Present Invention | 0.0908 |
| Single Channel Serpentine - Flow Field 96 | 14.79 |
| Multi-Channel Serpentine (5 Channels) | 0.591 |
| Multi-Channel Serpentine (10 Channels) | 0.148 |
| Pin Design - Flow Field 100 | 0.027 |

The results of the comparative analysis shown in Table 1 indicate that the novel design of flow field 28 of the present invention exhibits a substantially lower pressure drop as compared to the single serpentine design flow field 96 and the 5-channel serpentine design, with the pressure drop of flow field 28 being comparable to that calculated for the pin design of flow field 100 and the 10-channel serpentine design flow field.

2.0 Distribution of the Fraction of Fuel Remaining

As a further comparative analysis, the inventors calculated a distribution of the fraction of fuel remaining for hydrogen flowing through the flow field 28 of the present invention and the prior art flow field 96 shown in FIG. 5 in an effort to predict the effect of flow field geometry on fuel cell performance. Each of the flow fields 28 and 96 were divided into 6 parallel analytical sections A–F, as shown in FIGS. 4 and 5, with a fraction of fuel remaining calculated for each section. It is noted that the sections A–F do not correspond to physical flow splits within either flow field. The sections A–F do correspond however, to one of the sets 74 of flow channels 62 in each of two of the flow sectors 46. The calculations were completed based on cell operation at a constant load of 1 amp/cm$^2$ and reactant flow rates equal to twice the stoichiometric amount. The number of moles of hydrogen consumed per unit area of electrode and per unit time was calculated from the following equation:

$$F_{H_2 Consumed} = \frac{1}{2} \left( \frac{i}{F} \right)$$

wherein:
F=Faraday constant (96,486.7 Coulombs/mol);
i=current density in amps/cm$^2$;
Factor ½ accounts for the stoichiometric ratio of $H_2$ to $H^+$.
The results of the calculations comparing the distribution of the fraction of fuel remaining of flow field 28 to that of flow field 96 are presented in Table 2.

TABLE 2

| | Fraction of Fuel Remaining | |
|---|---|---|
| Section | Novel flow field | Single channel serpentine |
| A | 0.833 | 0.916 |
| B | 0.665 | 0.833 |
| C | 0.498 | 0.749 |
| D | 0.833 | 0.666 |
| E | 0.665 | 0.582 |
| F | 0.498 | 0.498 |

The results presented in Table 2 demonstrate that flow field 28 of the present invention distributes reactants more uniformly over the entire flow field, and consequently over the entire active area of the corresponding electrode, thereby exposing the corresponding electrode to a more symmetric distribution of reactant gases (in this case fuel). In contrast, the results corresponding to the single serpentine design flow field 96 indicate that while the portion of the corresponding electrode adjacent the supply to flow field 96 (section A) is exposed to a maximum fraction of fuel remaining, the average fraction of fuel remaining decreases monotonically along the flow field.

Although the distribution of the fraction of hydrogen remaining was not calculated for the pin-design flow field 100 illustrated in FIG. 6, it is noted that as the reactant gases enter the flow field 100, as depicted by flow arrow 104, they follow the path of least resistance across flow field 100 which may result in stagnant flow conditions, with little to no reactant flow existing in these stagnant areas.

In operation, gaseous hydrogen and water vapor flow through each of the flow sectors 46A–46D of the anode flow field plate 20A with a plurality of passes and through a plurality of channels 62 for each pass, as described previously and depicted generally by flow arrows 60A–60D, respectively. Similarly, air and water vapor travel through the flow channels 62 of the cathode flow field plate 20B. The hydrogen and water vapor then travel through the porous backing of the anode of MEA 12, and then through the interstitial spaces formed between the proton-conducting particles and the electrocatalyst particles to the catalytic reaction sites at the three phase boundaries where the hydrogen dissociatively adsorbs onto the active metal particles within the electrocatalyst layer, with electrons being released so as to form protons. The electrons are transported away from the reaction sites by the carbon particles within the electrocatalyst layer and the carbon material of the porous backing support. The protons are then conducted through membrane 16 and proton pathways formed by the proton-conducting particles in the electrocatalyst layer of the cathode 18 to the cathodic reaction sites. Air is also provided to the cathodic reaction sites, as well as the electrons created at the anodic reaction sites, which are provided after passing through an external load (not shown). Each of the current collector plates 22 includes a terminal, or tab 23, which is connected to the external load. Alternatively, plates 22 may be eliminated, with the external load coupled to plates 20A and 20B. At the cathodic reaction sites, the hydrogen protons react with absorbed oxygen and electrons to form water. The novel design of flow field 28 of the anode flow field plate 20A and the cathode flow field plate 20B provides a symmetric distribution of hydrogen and water vapor gases across the entire active area of the anode of MEA 12 and a symmetric distribution of the air and water vapor gases across the entire active area of the cathode 18 of MEA 12. Accordingly, the reactant gases in each flow sector are exposed to substantially equal pressure drops and flow conditions, with areas of stagnant flow being eliminated, so as to ensure maximum utilization of the anode and cathode 18 of MEA 12 and maximum efficiency of fuel cell 10.

While the foregoing description has set forth the preferred embodiments of the invention in particular detail, it must be understood that numerous modifications, substitutions, and changes can be undertaken without departing from the true spirit and scope of the present invention as defined by the ensuing claims. The invention is therefore not limited to specific preferred embodiments as described but is only limited as defined by the following claims.

What is claimed is:

1. A flow field plate for use in a proton exchange membrane fuel cell using a gaseous fuel and a gaseous oxidant, said flow field plate comprising:

a substantially planar surface;

a flow field formed in said substantially planar surface, said flow field being effective for transporting one of said gaseous fuel and said gaseous oxidant during operation of said fuel cell;

at least one supply flow passage effective for supplying said one of said gaseous fuel and said gaseous oxidant to said flow field during operation of said fuel cell;

at least one exhaust flow passage effective for receiving said one of said gaseous fuel and said gaseous oxidant discharging from said flow field during operation of said fuel cell;

wherein said flow field includes a plurality of substantially symmetric flow sectors, each of said flow sectors having a separate inlet communicating with said at least one supply flow passage and a separate outlet communicating with said at least one exhaust flow passage;

wherein said one of said gaseous fuel and said gaseous oxidant traverses each of said flow sectors in a plurality of passes during operation of said fuel cell;

wherein each of said flow sectors includes a plurality of substantially parallel flow channels formed in said substantially planar surface;

each of said flow sectors is partitioned so as to subdivide said plurality of substantially parallel flow channels into a plurality of sets of said flow channels; each of said sets of said flow channels includes a plurality of said flow channels; said sets of said flow channels are disposed in serial flow relationship with one another and said flow channels of each of said sets are disposed in parallel flow relationship with one another, whereby said one of said gaseous fuel and said gaseous oxidant traverses each of said flow sectors in said plurality of said passes during operation of said fuel cell, wherein the number of said passes is equal to the number of said sets of said flow channels.

2. The flow field plate as recited in claim 1, wherein each of said flow sectors further includes:

an inlet channel including said inlet of said flow sector, said inlet channel communicating with each of said flow channels of an upstream one of said sets of said flow channels;

an outlet channel including said outlet of said flow sector, said outlet channel communicating with each of said flow channels of a downstream one of said sets of said flow channels;

at least one connecting channel interconnecting each adjacent pair of said sets of said flow channels, said at least one connecting channel communicating with each said set of said adjacent pair of said sets of said flow channels.

3. The flow field plate as recited in claim 2, wherein:

said flow field comprises four of said substantially symmetric flow sectors.

4. The flow field plate as recited in claim 3, wherein:

each of said flow sectors includes three of said sets of said flow channels corresponding to said upstream and said downstream sets and an intermediate set disposed between said upstream and said downstream sets;

said at least one connecting channel comprises a pair of connecting channels, wherein a first one of said pair of said connecting channels interconnects said upstream set and said intermediate set of said flow channels and a second one of said pair of said connecting channels interconnects said intermediate set and said downstream set of said flow channels.

5. The flow field plate as recited in claim 4, wherein:

each of said sets of said flow channels in each of said flow sectors includes five of said substantially parallel flow channels.

6. The flow field plate as recited in claim 4, wherein:

said plurality of substantially parallel flow channels comprises a plurality of substantially parallel, open-faced flow channels, wherein said plurality of open-faced flow channels defines a plurality of lands, and wherein said flow channels and said lands are interdigitated.

7. The flow field plate as recited in claim 1, wherein:

each of said flow channels has a depth and a length, said depth being substantially constant throughout said length.

8. The flow field plate as recited in claim 7, wherein:

each of said flow channels has a substantially square cross-section.

9. The flow field plate as recited in claim 1, wherein:

said plurality of substantially parallel flow channels comprises a plurality of substantially parallel, open-faced flow channels, wherein said plurality of openfaced flow channels defines a plurality of lands, and wherein said flow channels and said lands are interdigitated.

10. The flow field plate as recited in claim 9, wherein:

each of said channels has a first width and each of said lands has a second width;

a ratio of said first width to said second width ranges from about 1.0 to about 2.0.

11. The flow field plate as recited in claim 1, wherein said flow field plate is made of a non-porous electrically conductive material.

12. The flow field plate as recited in claim 11, wherein said non-porous electrically conductive material comprises graphite.

13. The flow field plate as recited in claim 1, wherein:

said at least one supply flow passage comprises a plurality of supply flow passages, wherein each of said supply flow passages communicates with said inlet of one of said flow sectors.

14. The flow field plate as recited in claim 13, wherein:

said at least one exhaust flow passage comprises a plurality of exhaust flow passages, wherein each of said exhaust flow passages communicates with said outlet of one of said flow sectors.

* * * * *